United States Patent
Cho

(10) Patent No.: US 10,042,475 B2
(45) Date of Patent: Aug. 7, 2018

(54) OPTICAL TOUCH PANEL AND DETECTION METHOD THEREOF

(71) Applicant: Wistron Corporation, New Taipei (TW)

(72) Inventor: Ching-An Cho, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 132 days.

(21) Appl. No.: 14/715,679

(22) Filed: May 19, 2015

(65) Prior Publication Data

US 2016/0041688 A1    Feb. 11, 2016

(30) Foreign Application Priority Data

Aug. 7, 2014  (TW) .............................. 103127035 A

(51) Int. Cl.
*G06F 3/042*    (2006.01)
*G06F 3/041*    (2006.01)

(52) U.S. Cl.
CPC .......... *G06F 3/0418* (2013.01); *G06F 3/0421* (2013.01)

(58) Field of Classification Search
CPC ........ G06F 3/041; G06F 3/0418; G06F 3/042; G06F 3/0421; G06F 3/0425; G06F 2203/04104; G06F 2203/04108
USPC ................................................ 345/173, 175
See application file for complete search history.

(56) References Cited

U.S. PATENT DOCUMENTS

| | | | | |
|---|---|---|---|---|
| 7,538,894 B2 * | 5/2009 | Kobayashi | ............ | G06F 3/0416 345/175 |
| 7,599,520 B2 * | 10/2009 | Dempski | ............... | G06T 7/0075 345/176 |
| 7,932,899 B2 | 4/2011 | Newton et al. | | |
| 8,576,200 B2 * | 11/2013 | Zhu | ......................... | G06F 3/038 345/175 |
| 8,711,125 B2 * | 4/2014 | Zhu | ...................... | G01B 11/002 178/18.09 |
| 8,780,083 B2 * | 7/2014 | Tanaka | .................. | G06F 3/0421 178/18.01 |
| 9,213,448 B2 * | 12/2015 | Lin | ........................ | G06F 3/0428 |
| 9,569,063 B2 * | 2/2017 | Hwang | ................. | G06F 3/0481 |
| 2013/0278563 A1 * | 10/2013 | Chang | .................. | G06F 3/0416 345/175 |
| 2014/0146019 A1 * | 5/2014 | Lin | ....................... | G06F 3/0428 345/175 |

* cited by examiner

*Primary Examiner* — Jason Mandeville
(74) *Attorney, Agent, or Firm* — McClure, Qualey & Rodack, LLP

(57) ABSTRACT

An optical touch panel and a detection method thereof are provided. The detection method includes following steps. A main panel is sensed by a first optical sensor and a second optical sensor. If the first optical sensor and the second optical sensor both sense two objects approaching the main panel, and a quantity of at least one first reflection signal sensed by the first optical sensor and a quantity of at least one second reflection signal sensed by the second sensor are inconsistent, the at least one first reflection signal or the at least one second reflection signal that is not paired at a current time point is removed according to a pairing relationship between the at least one first reflection signal and the at least one second reflection signal at a previous time point.

6 Claims, 4 Drawing Sheets

OPTICAL TOUCH PANEL AND DETECTION METHOD THEREOF

This application claims the benefit of Taiwan application Serial No. 103127035, filed Aug. 7, 2014, the subject matter of which is incorporated herein by reference.

BACKGROUND OF THE INVENTION

Field of the Invention

The invention relates in general to a touch panel and a detection method thereof, and more particularly to an optical touch panel and a detection method thereof.

Description of the Related Art

Various input devices continue to evolve with progressing technologies. Among these input devices, touch panels are a breakthrough technology. A user is allowed to select or slide on a touch panel to trigger a key or to drag an object.

Touch panels includes resistive touch panels, capacitive touch panels and optical touch panels. Optical touch panels identify a position that a user selects on the panel through detecting changes in optical characteristics on the panel.

SUMMARY OF THE INVENTION

The invention is directed to an optical touch panel and a detection method thereof. By utilizing various processes, the optical touch panel and the detection method of the present invention are capable of enhancing the accuracy of touch control detection.

According to an aspect of the present invention, a detection method of an optical touch panel is provided. The detection method includes following steps. A main panel is sensed by a first optical sensor and a second optical sensor. When the first optical sensor and the second optical sensor both sense two objects approaching the main panel, and a quantity of at least one first reflection signal sensed by the first optical sensor and a quantity of at least one second reflection signal sensed by the second sensor are inconsistent, the at least one first reflection signal or the at least one second reflection signal that is not paired at a current time point is removed according to a pairing relationship between the at least one first reflection signal and the at least one second reflection signal at a previous time point.

According to another aspect of the present invention, an optical touch panel is provided. The optical touch panel includes a main panel, a first optical sensor, a second optical sensor and a processor. The first optical sensor is disposed at a corner of the main panel, and senses at least one first reflection signal on the main panel. The second optical sensor is disposed at another corner of the main panel, and senses at least one second reflection signal on the main panel. The processor determines whether both of the first optical sensor and the second optical sensor sense two object approaching the main panel, and determines whether a quantity of the at least one first reflection signal and a quantity of the at least one second reflection signal at a current time point are inconsistent. When both of the first optical sensor and the second optical sensor sense the two object approaching the main panel, and the quantity of the at least one first reflection signal and the quantity of the at least one second reflection signal at the current time point are inconsistent, the processor removes the at least one first reflection signal or the at least one second reflection signal that is not paired at the current time point according to a pairing relationship between the at least one first reflection signal and the at least one second reflection signal at a previous time point.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1A:
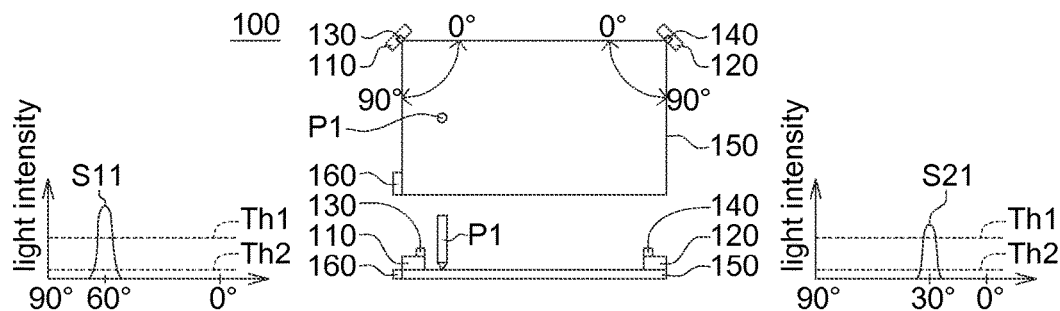
FIG. 1A is a schematic diagram of an optical touch panel being touched by a stylus.

FIG. 1A shows a schematic diagram of an optical touch panel 100 being touched by a stylus P1. The optical touch panel 100 includes a main panel 150, a first optical sensor 110, a second optical sensor 120, a first light source 130, a second light source 140, and a processor 160. The main panel 150 is a flat panel, on which a user may perform click-section or touch control using the stylus P1 or a finger.

The first light source 130 and the second light source 140 provide light beams on the main panel 150, such that a reflected light may be generated when the stylus P1 or the finger approaches the main panel 150. For example, the first light source 130 and the second light source 140 may be light-emitting diodes (LEDs), light tubes or light bulbs.

The first optical sensor 110 and the second optical sensor 120 sense the reflected light that is generated when the stylus P1 or the finger approaches or touches the main panel 150. The first optical sensor 110 and the first light source 130 are disposed at one corner of the main panel 150, and the second optical sensor 120 and the second light source 140 are disposed at another corner of the main panel 150. The left of FIG. 1A depicts a curve of a light intensity sensed by the first optical sensor 110 from 110 degrees to 90 degrees, and the right of FIG. 1A depicts a curve of a light intensity sensed by the second optical sensor from 90 degrees to 0 degree. When the stylus P1 touches the main panel 150, the first optical sensor 110 and the second optical sensor 120 respectively sense a first reflection signal S11 and a second reflection signal S21 by a first light intensity threshold Th1. The first reflection signal S11 is located at a position of 60 degrees, and the second reflection signal S21 is located at a position of 30 degrees. From angle coordinates of the first reflection signal S11 and the second reflection signal S21, a position of the stylus P1 on the main panel 150 can be learned. For example, the first optical sensor 110 and the second optical sensor 120 are cameras or optical sensor chips.

It is discovered from FIG. 1A that, as the stylus P1 is closer to the first optical sensor 110, the light intensity of the first reflection signal S11 is greater than the light intensity of the second reflection signal S21.

The processor 160 performs various calculation or processing processes. For example, the processor 160 is a processor chip, a circuit board, or a memory medium that stores multiple sets of program codes.

Figure 1B:
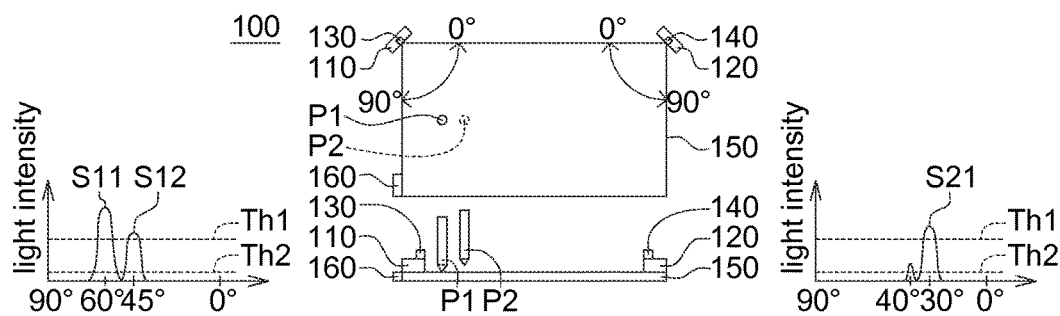
FIG. 1B is a schematic diagram of the optical touch panel in FIG. 1A being approached by another stylus.

FIG. 1B shows a schematic diagram of the optical touch panel 100 in FIG. 1A further being gradually approached by a stylus P2. When the stylus P2 gradually approaches the optical touch panel 100, the reflection light of the stylus P2 gradually intensifies. At this point, the first optical sensor 110 and the second optical sensor 120 respectively sense that the two styluses P1 and P2 are above the main panel 150 by a second light intensity threshold Th2. The second light intensity threshold Th2 is smaller than the first light intensity threshold Th1.

The stylus P2 is closer to the first optical sensor 110. The first optical sensor 110 first senses another first reflection signal S12 by the first light intensity threshold Th1. However, as the stylus P2 is farther from the second optical sensor 120 and the stylus P2 is not yet in contact with the main panel 150, the second optical sensor 120 is incapable of sensing any reflection signals generated by the stylus P2 by the first light intensity threshold Th1.

Therefore, in FIG. 1B, the quantity of the first reflection signals S11 and S12 and the quantity of the second reflection signal S21 are inconsistent, leading to asynchronous touch control detection.

Figure 1C:
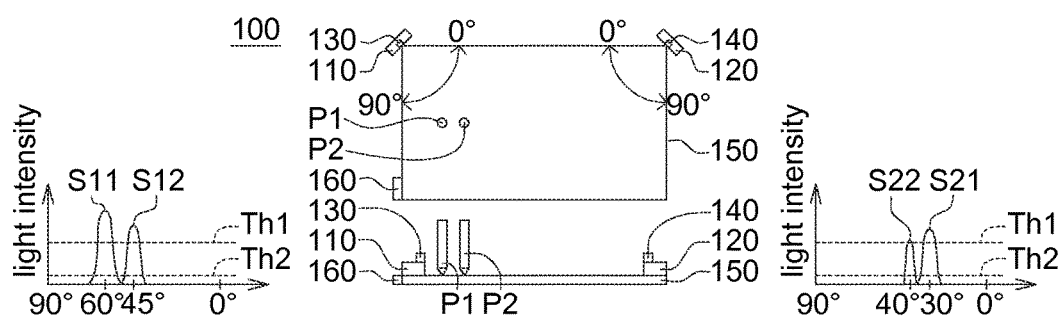
FIG. 1C is a schematic diagram of the optical touch panel in FIG. 1B being further touched by the approaching stylus.

FIG. 1C shows a schematic diagram of the optical touch panel 100 in FIG. 1B further being touched by the stylus P2. After the stylus P2 touches the main panel 150, the second optical sensor 120 also senses anther second reflection signal S22 by the first light intensity threshold Th1. Therefore, in FIG. 1C, the quantity of the first reflection signals S11 and S12 and the quantity of the second reflection signals S21 and S22 are consistent. Thus, the first reflection signal S11 and the second reflection signal S21 are paired into one set of coordinates of a touch point, and the first reflection signal S12 and the second reflection signal S22 are paired into another set of coordinates of another touch point, so that the optical touch panel 100 successfully detects two touch points.

Figure 1D:
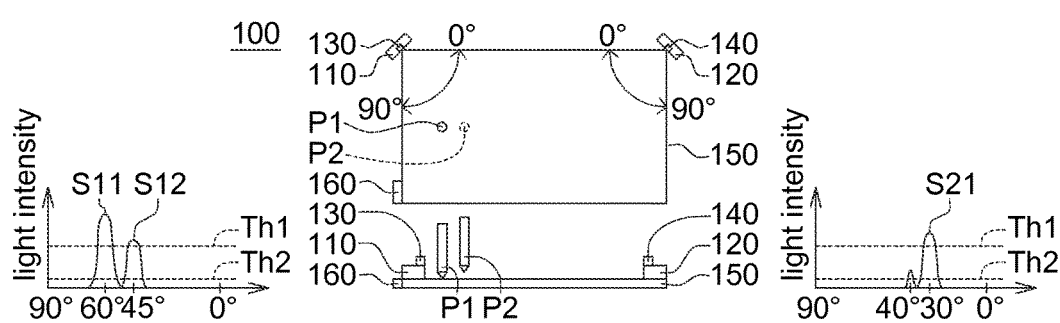
FIG. 1D is a schematic diagram of the stylus on the optical touch panel in FIG. 1C gradually departing the optical touch panel.

FIG. 1D shows a schematic diagram of the stylus P2 on the optical touch panel 100 in FIG. 1C gradually departing the optical touch panel 100. When the stylus P2 gradually departs, the reflection light of the stylus P2 gradually weakens. At this point, the first optical sensor 110 and the second optical sensor 120 can still sense the two styluses P1 and P2 by the second light intensity threshold Th2.

The stylus P2 is closer to the first optical sensor 110, which accordingly continually senses the first reflection signal S12 by the first light intensity threshold Th1. However, as the stylus P2 is farther from the second optical sensor and the stylus P2 has already left the main panel 150, the second optical sensor 120 is incapable of sensing any reflection signal generated by the stylus P2 by the first light intensity threshold Th1.

Therefore, in FIG. 1D, the quantity of the first reflection signals S11 and S12 and the quantity of the second reflection signal S21 are inconsistent, leading to asynchronous touch control detection.

As shown in FIG. 1A and FIG. 1B, when the newly added stylus P2 gradually approaches the optical touch panel 100, the first optical sensor 110 and the second optical sensor 120 respectively sense that the two styluses P1 and P2 are above the main panel 150 by the second light intensity threshold Th2. However, in FIG. 1B, the quantity of the first reflection signals S11 and S12 and the quantity of the second reflection signal S21 are inconsistent, leading to asynchronous touch control detection.

As shown in FIG. 1C and FIG. 1D, when the stylus P2 gradually departs the optical touch panel 100, the first optical sensor 110 and the second optical sensor 120 respectively sense that the two styluses P1 and P2 are above the main panel 150 by the second light intensity threshold Th2. However, in FIG. 1D, the quantity of the first reflection signals S11 and S12 and the quantity of the second reflection signal S21 are inconsistent, leading to asynchronous touch control detection.

Figure 2:
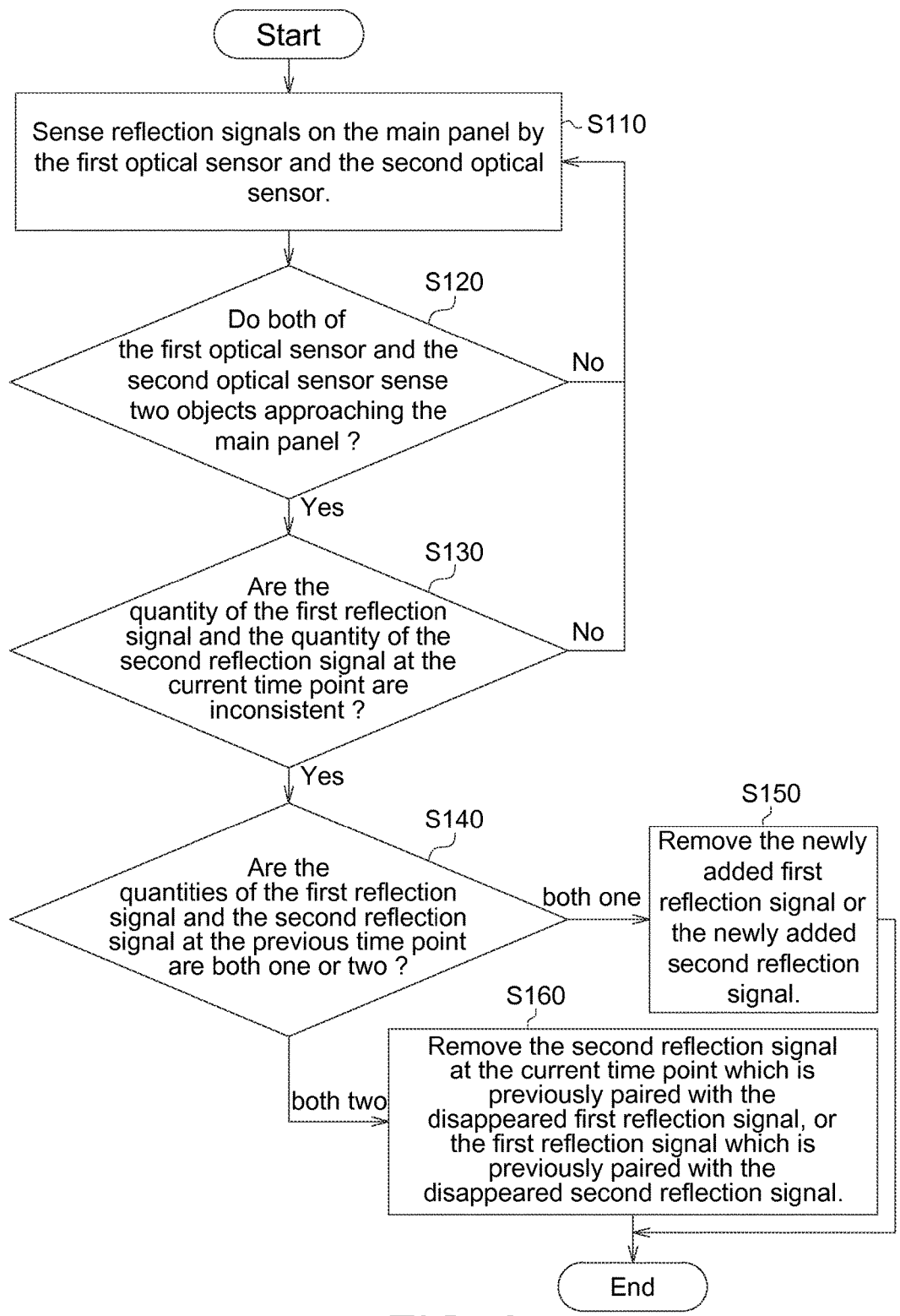
FIG. 2 is a flowchart of a detection method of an optical touch panel.

FIG. 2 shows a flowchart of a detection method of the optical touch panel 100. With the detection method in FIG. 2, the asynchronous touch control detection can be prevented. Details of how the detection method in FIG. 2 solves the asynchronous touch control detection in FIG. 1B are given below. In step S110, reflection signals on the main panel 150 are sensed by the first optical sensor 110 and the second optical sensor 120.

In step S120, the processor 160 first determines whether both of the first optical sensor 110 and the second optical sensor 120 sense two objects approaching the main panel 150. Step S130 is performed when both of the first optical sensor 110 and the second optical sensor 120 sense the two objects approaching the main panel 150, or else step S110 is iterated when the first optical sensor 110 and the second optical sensor 120 do not sense two objects approaching the main panel 150. In FIG. 1B, the first optical sensor 110 and the second optical sensor 120 sense the two styluses P1 and P2 approaching the main panel 150 by the second light intensity threshold Th2, and so step S130 is performed.

In step S130, the processor 160 determines whether the quantity of the first reflection signal and the quantity of the second reflection signal at a current time point are inconsistent. Step S140 is performed when the quantity of the first reflection signal and the quantity of the second reflection signal are inconsistent, or else step S110 is iterated when the quantity of the first reflection signal and the quantity of the second reflection signal are consistent. In FIG. 1B, at the current time point, the first optical sensor 110 and the second optical sensor 120 sense the first reflection signals S11 and S12 and the second reflection signal S21 by the first light intensity threshold Th1. That is, the quantity of the first reflection signal S11 and S12 and the quantity of the second reflection signal S21 are inconsistent, and so steps S140 to S160 are performed.

In steps S140 to S160, according to a pairing relationship between the first reflection signal and the second reflection signal at a previous time point and a pairing relationship of the at least one first reflection signal and the at least one second reflection signal at the current time point, the processor 160 removes the first reflection signal or the second reflection signal that is not paired at the current time point.

In step S140, the processor 160 determines whether the quantities of the first reflection signal and the second reflection signal at the previous time point are both one or two. Step S150 is performed when the quantities of the first reflection signal and the second reflection signal at the previous time point are both one, or step S160 is performed when the quantities of the first reflection signal and the second reflection signal at the previous time point are both two. In FIG. 1A, at the previous time point, the quantities of the first reflection signal S11 and the second reflection signal S21 are both one, and so step S150 is performed.

In step S150, the processor 160 removes the newly added first reflection signal or the newly added second reflection signal. In FIG. 1B, at the current time point, the newly added first reflection signal S12 is removed, and the first reflection signal S11 and the second reflection signal S21 that are paired and preserved to solve the asynchronous touch control detection. Only in FIG. 1C, the quantity of the first reflection signals S11 and S12 and the quantity of the second reflection signals S21 and S22 become consistent, and so the first reflection signal S12 and the second reflection signal S22 are preserved.

Details of how the detection method in FIG. 2 solves the asynchronous touch control detection in FIG. 1D are given below. In step S110, as shown in FIG. 1D, the first optical sensor 110 and the second optical sensor 120 sense reflection signals on the main panel 150.

In step S120, as shown in FIG. 1D, both of the first optical sensor 110 and the second optical sensor 120 sense the two styluses P1 and P2 approach the main panel 150 by the second light intensity threshold Th2, and so step S130 is performed.

In step S130, in FIG. 1D, at the current time point, the first optical sensor 110 and the second optical sensor 120 sense the first reflection signals S11 and S12 and the second reflection signal S21 by the first light intensity threshold Th1. That is, the quantity of the first reflection signals S11 and S12 and the quantity of the second reflection signal S21 are inconsistent, and so step S140 to S160 are performed.

In step S140, as shown in FIG. 1C, at the previous time point, the quantities of the first optical signal S11 and the second reflection signal S21 are both two, step S160 is performed.

In step S160, at the current moment, the processor 160 removes the second reflection signal at the current time point which is previously paired with the disappeared first reflection signal, or the first reflection signal which is previously paired with the disappeared second reflection signal. In FIG. 1D, at the current time point, the first reflection signal S12 at the current time point which is previously paired with the disappeared second reflection signal S22 needs to be removed, and the paired first reflection signal S11 and second reflection signal S21 are preserved, thereby solving the asynchronous touch control detection.

In FIG. 1A to FIG. 1D, the touch points of the two styluses P1 and P2 are in a horizontal arrangement. In FIG. 3A to FIG. 3D below, situations where the styluses P1 and P2 are in a vertical arrangement are described.

Figure 3A:
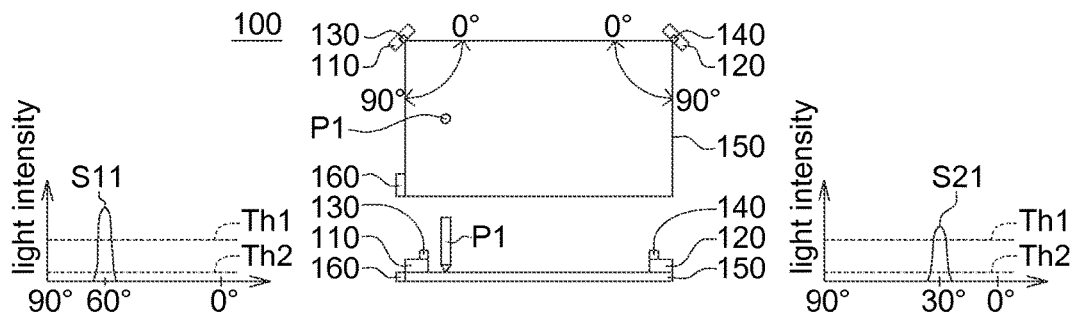
FIG. 3A to FIG. 3D are situations where touch points of two styluses are in a vertical arrangement.
Figure 3B:
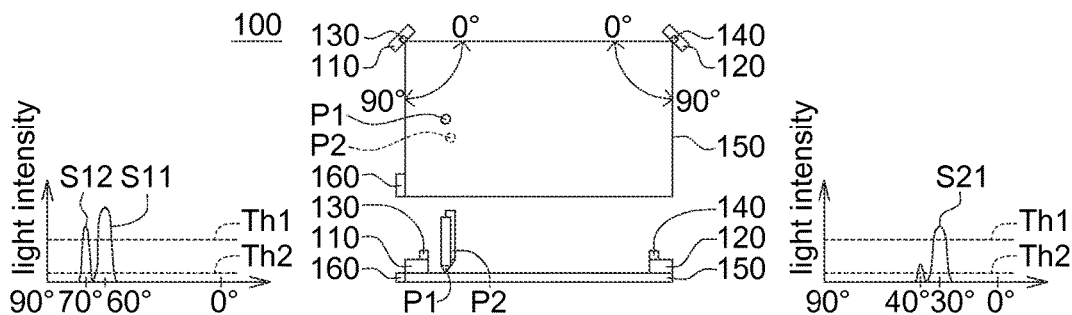

Details of how the detection method in FIG. 2 solves the asynchronous touch control detection in FIG. 3B are given below. In step S110, as shown in FIG. 3B, the first optical sensor 110 and the second optical sensor 120 sense the reflection signals on the main panel 150.

In step S120, as shown in FIG. 3B, both of the first optical sensor 110 and the second optical sensor 120 sense the two styluses P1 and P2 approaching the two styluses P1 and P2 by the second light intensity threshold Th2, and so step S130 is performed.

In step S130, as shown in FIG. 3B, at the current time point, the first optical sensor 110 and the second optical sensor 120 sense the first reflection signals S11 and S12 and the second reflection signal S21 by the first light intensity threshold Th1. That is, the quantity of the first reflection signals S11 and S12 and the quantity of the second reflection signal S21 are inconsistent, and so step S140 to S160 are performed.

In step S140, as shown in FIG. 3A, at the previous time point, the quantities of the first reflection signal S11 and the second reflection signal S21 are both one, and so step S150 is performed.

In step S150, as shown in FIG. 3B, at the current time point, the newly added first reflection signal S12 is removed, and the paired first reflection signal S11 and second reflection signal S21 are preserved, thereby solving the asynchronous touch control detection. Only in FIG. 3C, the quantity of the first reflection signals S11 and S12 and the quantity of the second reflection signals S21 and S22 become consistent. Thus, the first reflection signal S12 and the second reflection signal S22 are preserved.

Figure 3C:
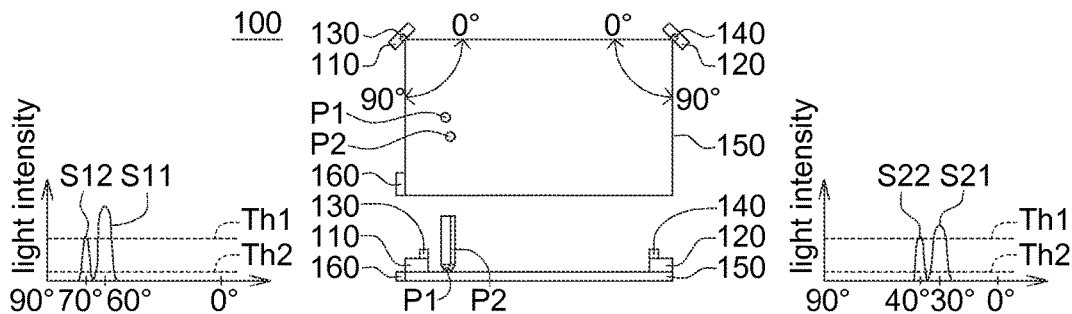
Figure 3D:
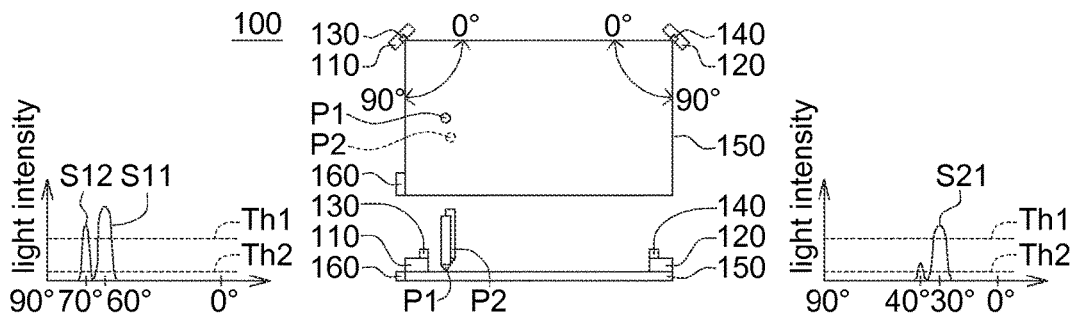

Details of how the detection method in FIG. 2 solves the asynchronous touch control detection in FIG. 3D are given below. In step S110, as shown in FIG. 3D, the first optical sensor 110 and the second optical sensor 120 sense reflection signals on the main panel 150.

In step S120, as shown in FIG. 3D, both of the first optical sensor 110 and the second optical sensor 120 sense the two styluses P1 and P2 approaching the main panel 150 by the second light intensity threshold Th2, and so step S130 is performed.

In step S130, as shown in FIG. 3D, at the current time point, the first optical sensor 110 and the second optical sensor 120 sense the first reflection signals S11 and S12 and the second reflection signal S21 by the first light intensity threshold Th1. That is, the quantity of the first reflection signals S11 and S12 and the quantity of the second reflection signal S21 are inconsistent, and so steps S140 to S160 are performed.

In step S140, as shown in FIG. 3C, at the previous time point, the quantities of the first reflection signal S11 and the second reflection signal S21 are both two, and so step S160 is performed.

In step S160, as shown in FIG. 3D, at the current time point, the first reflection signal S12 at the current time point which is previously paired with the disappeared second reflection signal S22 needs to be removed, and the paired first reflection signal S11 and second reflection signal S21 are preserved, thereby solving the asynchronous touch control detection.

Figure 4:
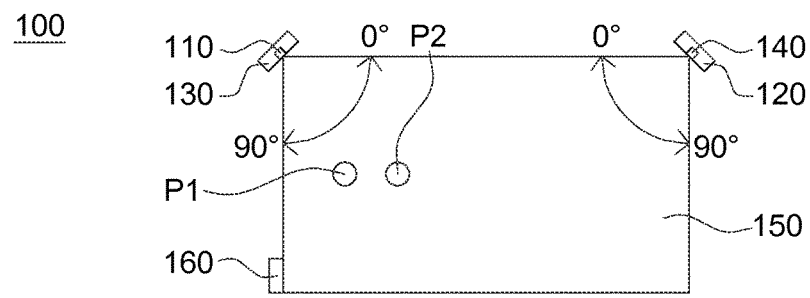
FIG. 4 is a schematic diagram of two styluses both being closer to a first optical sensor.

Refer to FIG. 4 and Table-1. FIG. 4 shows a schematic diagram of the styluses P1 and P2 being closer to the first optical sensor 110. Table-1 lists all possible scenarios of the first reflection signal and the second reflection signal in FIG. 4. According to a time sequence from a first time point to a third time point, asynchronous touch control detection may take place at the second time point in between. In Table-1, the first reflection signal or the second reflection signal that needs to be removed is crossed by a slanted line. Further, in Table-1, four situations of "stylus P2 approaching", "stylus P1 approaching", "stylus P2 departing" and "stylus P1 departing" are illustrated. The situation of "stylus P2 approaching" is previously described with reference to FIGS. 1A to 1C, and the situation of "stylus P2 departing" is previously described with reference to FIG. 1C and FIG. 1D.

TABLE 1

| Time | First optical sensor 110 | | Second optical sensor 120 | |
|---|---|---|---|---|
| | Stylus P1 | Stylus P2 | Stylus P1 | Stylus P2 |
| Stylus P2 approaching | | | | |
| First time point | First reflection signal S11 | | Second reflection signal S21 | |
| Second time point | First reflection signal S11 | ~~First reflection signal S12~~ | Second reflection signal S21 | |
| Third time point | First reflection signal S11 | First reflection signal S12 | Second reflection signal S21 | Second reflection signal S22 |
| Stylus P1 approaching | | | | |
| First time point | | First reflection signal S12 | | Second reflection signal S22 |
| Second time point | ~~First reflection signal S11~~ | First reflection signal S12 | | Second reflection signal S22 |
| Third time point | First reflection signal S11 | First reflection signal S12 | Second reflection signal S21 | Second reflection signal S22 |
| Stylus P2 departing | | | | |
| First time point | First reflection signal S11 | First reflection signal S12 | Second reflection signal S21 | Second reflection signal S22 |
| Second time point | First reflection signal S11 | ~~First reflection signal S12~~ | Second reflection signal S21 | |
| Third time point | First reflection signal S11 | | Second reflection signal S21 | |
| Stylus P1 departing | | | | |
| First time point | First reflection signal S11 | First reflection signal S12 | Second reflection signal S21 | Second reflection signal S22 |
| Second time point | ~~First reflection signal S11~~ | First reflection signal S12 | | Second reflection signal S22 |
| Third time point | | First reflection signal S12 | | Second reflection signal S22 |

TABLE 2

| Time | First optical sensor 110 | | Second optical sensor 120 | |
|---|---|---|---|---|
| | Stylus P1 | Stylus P2 | Stylus P1 | Stylus P2 |
| Stylus P2 approaching | | | | |
| First time point | First reflection signal S11 | | Second reflection signal S21 | |
| Second time point | First reflection signal S11 | | Second reflection signal S21 | ~~Second reflection signal S22~~ |
| Third time point | First reflection signal S11 | First reflection signal S12 | Second reflection signal S21 | Second reflection signal S22 |
| Stylus P1 approaching | | | | |
| First time point | | First reflection signal S12 | | Second reflection signal S22 |
| Second time point | ~~First reflection signal S11~~ | First reflection signal S12 | | Second reflection signal S22 |
| Third time point | First reflection signal S11 | First reflection signal S12 | Second reflection signal S21 | Second reflection signal S22 |
| Stylus P2 departing | | | | |
| First time point | First reflection signal S11 | First reflection signal S12 | Second reflection signal S21 | Second reflection signal S22 |
| Second time point | First reflection signal S11 | | Second reflection signal S21 | ~~Second reflection signal S22~~ |
| Third time point | First reflection signal S11 | | Second reflection signal S21 | |
| Stylus P1 departing | | | | |
| First time point | First reflection signal S11 | First reflection signal S12 | Second reflection signal S21 | Second reflection signal S22 |
| Second time point | ~~First reflection signal S11~~ | First reflection signal S12 | | Second reflection signal S22 |
| Third time point | | First reflection signal S12 | | Second reflection signal S22 |

Figure 5:
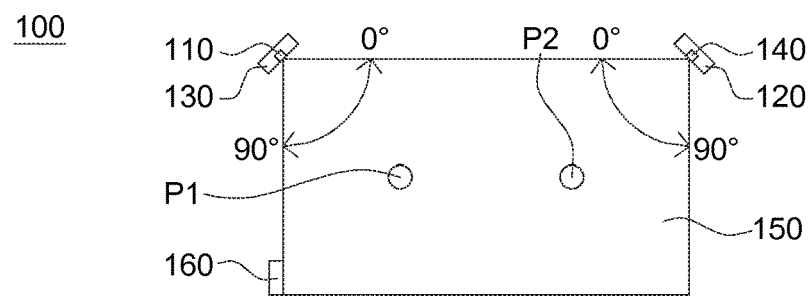
FIG. 5 is a schematic diagram of one stylus being closer to a first optical sensor and another stylus being closer to a second optical sensor.

Refer to FIG. 5 and Table-2. FIG. 5 shows a schematic diagram of the stylus P1 being closer to the first optical sensor 110 and the stylus P2 being closer to the second optical sensor 120. Table-2 lists all possible scenarios of the first reflection signal and the second reflection signal in FIG. 5. According to a time sequence from a first time point to a third time point, asynchronous touch control detection may take place at the second time point in between. In Table-2, the first reflection signal or the second reflection signal that needs to be removed is crossed by a slanted line. Further, in Table-2, four situations of "stylus P2 approaching", "stylus P1 approaching", "stylus P2 departing" and "stylus P1 departing" are illustrated.

Figure 6:
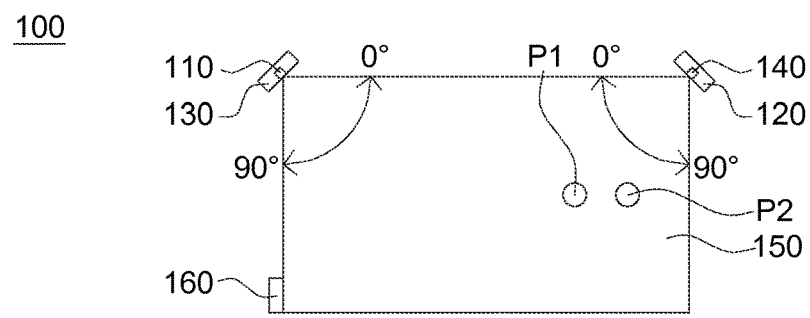
FIG. 6 is a schematic diagram of two styluses both being closer to the second optical sensor.

Refer to FIG. 6 and Table-3. FIG. 6 shows a schematic diagram of both of the styluses P1 and P2 being closer to the second optical sensor 120. Table-3 lists all possible scenarios of the first reflection signal and the second reflection signal in FIG. 6. According to a time sequence from a first time point to a third time point, asynchronous touch control detection may take place at the second time point in between. In Table-3, the first reflection signal or the second reflection signal that needs to be removed is crossed by a slanted line. Further, in Table-3, four situations of "stylus P2 approaching", "stylus P1 approaching", "stylus P2 departing" and "stylus P1 departing" are illustrated.

TABLE 3

| Time | First optical sensor 110 | | Second optical sensor 120 | |
|---|---|---|---|---|
| | Stylus P1 | Stylus P2 | Stylus P1 | Stylus P2 |
| Stylus P2 approaching | | | | |
| First time point | First reflection signal S11 | | Second reflection signal S21 | |
| Second time point | First reflection signal S11 | | Second reflection signal S21 | Second reflection signal S22 |
| Third time point | First reflection signal S11 | First reflection signal S12 | Second reflection signal S21 | Second reflection signal S22 |
| Stylus P1 approaching | | | | |
| First time point | | First reflection signal S12 | | Second reflection signal S22 |
| Second time point | | First reflection signal S12 | Second reflection signal S21 | Second reflection signal S22 |
| Third time point | First reflection signal S11 | First reflection signal S12 | Second reflection signal S21 | Second reflection signal S22 |
| Stylus P2 departing | | | | |
| First time point | First reflection signal S11 | First reflection signal S12 | Second reflection signal S21 | Second reflection signal S22 |
| Second time point | First reflection signal S11 | | Second reflection signal S21 | Second reflection signal S22 |
| Third time point | First reflection signal S11 | | Second reflection signal S21 | |
| Stylus P1 departing | | | | |
| First time point | First reflection signal S11 | First reflection signal S12 | Second reflection signal S21 | Second reflection signal S22 |
| Second time point | | First reflection signal S12 | Second reflection signal S21 | Second reflection signal S22 |
| Third time point | | First reflection signal S12 | | Second reflection signal S22 |

According the above embodiments, regardless of the position of the stylus, asynchronous touch control detection potentially caused when the stylus approaches or departs an optical touch panel can be effectively prevented, thereby effectively enhancing the accuracy of touch control detection.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A detection method of an optical touch panel, comprising:
    sensing a main panel by a first optical sensor arranged at one end of the optical touch panel and a second optical sensor arranged at another end of the optical touch panel, the first optical sensor and the second optical sensor sensing lights reflected from two objects approaching or touching the main panel, wherein the first optical sensor senses first reflection signals and the second optical sensor senses second reflection signals;
    determining whether both of the first optical sensor and the second optical sensor sense two objects approaching the main panel at a current time point by comparing the first reflection signals and the second reflection signals to a preset light intensity threshold, wherein the two objects are sensed by both of the first optical sensor and the second optical sensor when two of the sensed first reflection signals and two of the sensed second reflection signals exceed the preset light intensity threshold at the current time point;
    when both of the first optical sensor and the second optical sensor sense the two objects approaching the main panel, determining whether a quantity of the first reflection signals sensed by the first optical sensor and a quantity of the second reflection signals sensed by the second optical sensor at the current time point are inconsistent by comparing the first reflection signals and the second reflection signals to a default light intensity threshold greater than the preset light intensity threshold, wherein the quantity of the first reflection signals and the quantity of the second reflection signals are inconsistent when the quantity of the first reflection signals that exceed the default light intensity threshold is different from the quantity of the second reflection signals that exceed the default light intensity threshold; and
    when both of the first optical sensor and the second optical sensor sense the two objects approaching the main panel and the quantity of the first reflection signals sensed by the first optical sensor that exceed the default light intensity threshold and the quantity of the second reflection signals sensed by the second optical sensor that exceed the default light intensity threshold at the current time point are inconsistent, removing at least one first reflection signal or at least one second reflection signal at the current time point by determining whether the quantity of first reflection signals and the quantity of second reflection signals that exceeded the default light intensity threshold at a previous time point are both one or both two.

2. The detection method according to claim 1, wherein when the quantity of first reflection signals and the quantity of second reflection signals that exceeded the default light intensity threshold at the previous time point are both one, a newly added first reflection signal or a newly added second reflection signal that exceeds the default light intensity threshold at the current time point but did not exceed the default light intensity threshold at the previous time point is removed.

3. The detection method according to claim 1, wherein when the quantity of first reflection signals and the quantity of second reflection signals that exceeded the default light intensity threshold at the previous time point are both two, a first reflection signal or a second reflection signal that does not exceed the default light intensity threshold at the current time point but exceeded the default light intensity threshold at the previous time point is removed.

4. An optical touch panel, comprising:
a main panel;
a first optical sensor disposed at a corner of the main panel, configured to sense light reflected from two objects approaching or touching the main panel, the first optical sensor sensing first reflection signals;
a second optical sensor disposed at another corner of the main panel, configured to sense light reflected from the two objects approaching or touching the main panel, the second optical sensor sensing second reflection signals; and
a processor configured to determine whether both of the first optical sensor and the second optical sensor sense two objects approaching the main panel at a current time point by comparing the first reflection signals and the second reflection signals to a preset light intensity threshold, wherein the two objects are sensed by both of the first optical sensor and the second optical sensor when two of the sensed first reflection signals and two of the sensed second reflection signals exceed the preset light intensity threshold at the current time point, and when both of the first optical sensor and the second optical sensor sense the two objects approaching the main panel, determine whether a quantity of the first reflection signals and a quantity of the second reflection signals at the current time point are inconsistent by comparing the first reflection signals and the second reflection signals to a default light intensity threshold greater than the preset light intensity threshold, wherein the quantity of the first reflection signals and the quantity of the second reflection signals are inconsistent when the quantity of the first reflection signals that exceed the default light intensity threshold is different from the quantity of the second reflection signals that exceed the default light intensity threshold;
wherein when both of the first optical sensor and the second optical sensor sense the two objects approaching the main panel, and the quantity of the first reflection signals sensed by the first optical sensor that exceed the default light intensity threshold and the quantity of the second reflection signals sensed by the second optical sensor that exceed the default light intensity threshold at the current time point are inconsistent, the processor removes at least one first reflection signal or at least one second reflection signal at the current time point by determining whether the quantity of first reflection signals and the quantity of second reflection signals that exceeded the default light intensity threshold at a previous time point are both one or both two.

5. The optical touch panel according to claim 4, wherein when the quantity of first reflection signals and the quantity of second reflection signals that exceeded the default light intensity threshold at the previous time point are both one, a newly added first reflection signal or a newly added second reflection signal that exceeds the default light intensity threshold at the current time point but did not exceed the default light intensity threshold at the previous time point is removed.

6. The optical touch panel according to claim 4, wherein when the quantity of first reflection signals and the quantity of second reflection signals that exceeded the default light intensity threshold at the previous time point are both two, a first reflection signal or a second reflection signal that does not exceed the default light intensity threshold at the current time point but exceeded the default light intensity threshold at the previous time point is removed.

* * * * *